United States Patent [19]

Gregory et al.

[11] Patent Number: 5,759,247
[45] Date of Patent: Jun. 2, 1998

[54] INK COMPOSITIONS PROCESSES AND USES

[75] Inventors: Peter Gregory, Bolton; John Anthony Taylor, Manchester, both of United Kingdom

[73] Assignee: Zeneca Limited, London, England

[21] Appl. No.: 825,925

[22] Filed: Apr. 2, 1997

[51] Int. Cl.$^6$ ................................................... C09D 11/02
[52] U.S. Cl. ......................... 106/31.45; 106/31.44; 106/31.47; 106/31.49; 106/31.51; 106/31.52; 427/394
[58] Field of Search .................... 106/31.45, 31.44, 106/31.47, 31.49, 31.51, 31.52; 427/394

[56] References Cited

U.S. PATENT DOCUMENTS

| | | | |
|---|---|---|---|
| 4,101,547 | 7/1978 | Mislin et al. | 106/31.45 |
| 4,124,355 | 11/1978 | Greenhalgh et al. | 106/31.45 |
| 4,141,682 | 2/1979 | Greenhalgh et al. | 106/31.45 |
| 4,776,886 | 10/1988 | Lorenz et al. | 106/31.52 |
| 4,784,668 | 11/1988 | Breitschaft et al. | 106/31.52 |
| 5,203,912 | 4/1993 | Greenwood et al. | 106/31.52 |
| 5,254,160 | 10/1993 | Beach et al. | 106/31.51 |
| 5,281,263 | 1/1994 | Gregory et al. | 106/31.52 |
| 5,542,972 | 8/1996 | Von Der Eltz et al. | 106/31.45 |

FOREIGN PATENT DOCUMENTS

| | | | |
|---|---|---|---|
| 0 415 585 A1 | 3/1991 | European Pat. Off. | C07C 229/60 |
| 2 020 679 | 11/1979 | United Kingdom | C09B 62/00 |

*Primary Examiner*—Helene Klemanski
*Attorney, Agent, or Firm*—Pillsbury Madison & Sutro LLP

[57] ABSTRACT

An ink composition comprising a dye containing at least one group of the Formula (1):

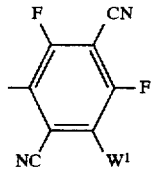

Formula (1)

wherein:

$W^1$ is —F, —$OR^1$, —$SR^1$ or —$NR^1R^2$ in which $R_1$ and $R^2$ each independently is H, optionally substituted alkyl, cycloalkyl, optionally substituted alkenyl, optionally substituted aryl, optionally substituted aralkyl or $R^1$ and $R^2$ together with the nitrogen atom to which they are attached form a 5 or 6 membered ring; and a medium comprising at least one of a low melting point solid, an organic solvent and a mixture of water and one more water-soluble organic solvent(s).

Also claimed is a process for ink jet printing using the inks, a process for ink jet printing of textiles using the inks and a toner containing a dye with at least one group of Formula (1).

12 Claims, No Drawings

INK COMPOSITIONS PROCESSES AND USES

The present invention relates to compositions and solutions thereof, suitable for use in printing and imaging technologies, especially those suitable for coloration of substrates such as paper, plastics, textiles, metal or glass by printing processes such as ink jet printing and those suitable for use in electrophotography such as toners.

Ink jet printing is a non-impact printing technique which involves ejecting, thermally or by action of an oscillating piezo crystal, droplets of ink continuously or on demand from a fine nozzle directly onto a substrate such as paper, plastics, textile, metal or glass. The ink may be aqueous, solvent or hot melt based and must provide sharp, non-feathered images which have good waterfastness, light fastness and optical density, have fast fixation to the substrate and cause no clogging of the nozzle.

Electrophotographic copiers or printers generally comprise an organic photoconductor (OPC) and a developer or toner. The OPC generally comprises an electrically conducting support, a charge generating layer and a charge transport layer. The electrically conducting support is a metal drum, typically an aluminium drum, or a metallised polymer film, typically aluminised polyester. The charge generating layer comprises a charge generating material (CGM) and a binder resin, typically a polycarbonate. The charge transport later comprises a charge transport material (CTM) and a binder resin, typically a polycarbonate. The developer or toner comprises a toner resin, a colorant and optionally a charge control agent (CCA). The toner resin is typically a styrene or substituted styrene polymer or styrene-butadiene copolymer. The colorant is typically a dye or pigment or mixture thereof.

According to the present invention there is provided an ink composition comprising a dye having at least one group of the Formula (1):

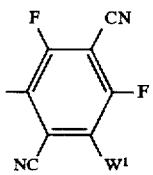

Formula (1)

wherein:

$W^1$ is —F, —$OR^1$, —$SR^1$ or —$NR^1R^2$ in which $R^1$ and $R^2$ each independently is H, optionally substituted alkyl, cycloalkyl, optionally substituted alkenyl, optionally substituted aryl, optionally substituted aralkyl, or $R^1$ and $R^2$ together with the nitrogen atom to which they are attached form a 5 or 6 membered ring; and a medium comprising at least one of a low melting point solid, an organic solvent and a mixture of water and one more water-soluble organic solvent(s).

$W^1$ is preferably F; OH; SH; alkoxy, such as methoxy or ethoxy; hydroxy-$C_{2-4}$-alkylamino, such as mono or di-(2-hydroxyethyl)amino; morpholinyl; piperidinyl; piperazinyl; 4-(hydroxy-$C_{2-4}$-alkyl)-piperazin-1-yl, such as 4-hydroxyethylpiperazin-1-yl; 4-($C_{1-4}$-alkyl)piperazin-1-yl, such as 4-methylpiperazin-1-yl; $C_{1-6}$-alkylamino, such as dimethylamino, n-butylamino or n-hexylamino; carboxy-$C_{1-4}$-alkylamino, such as 2-carboxymethylamino; arylamino, such as phenylamino, mono-3- or di-3,5-carboxyanilino; or aralkylamino, such as benzylamino, mono-3- or di-3,5-carboxyphenylmethylamino. Where $W^1$ is alkyl or alkoxy these preferably contain from 1 to 4 carbon atoms.

In a particularly preferred embodiment $W^1$ is F.

$R^1$ and $R^2$ each independently is preferably selected from H, $C_{1-10}$-alkyl especially $C_{1-4}$-alkyl, substituted $C_{1-10}$-alkyl especially substituted $C_{1-4}$-alkyl, phenyl, substituted phenyl, $(CH_2)_{1-4}$-phenyl and substituted $(CH_2)_{1-4}$-phenyl especially benzyl and substituted benzyl. When any one of $R^1$ or $R^2$ is substituted, the substituent is preferably selected from —OH, —$CH_3$, —$OCH_3$, —$SO_3H$ and —$CO_2H$. When $R^1$ and $R^2$ together with the nitrogen atom to which they are attached form a 5- or 6-membered ring, this is preferably morpholine, piperidine or piperazine especially the latter in which the free ring N-atom may be, and preferably is, substituted by a $C_{1-4}$-alkyl or hydroxy-$C_{2-4}$-alkyl group.

It is preferred that the group of Formula (1) is attached to an amine group in the dye, more preferably an amine group of formula —$NR^3$— wherein $R^3$ is H or alkyl, especially H or $C_{1-4}$-alkyl. The amine group is preferably attached to a carbon atom in an aromatic ring, for example a phenylene or naphthylene ring.

Preferably the dye is water-soluble. Preferred dyes according to the invention contain at least two, more preferably at least 3 and preferably less than 11 sulpho groups.

One class of dye according to the invention contains a group of the Formula (2):

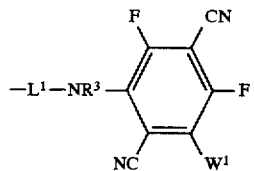

Formula (2)

wherein:

$L^1$ is an arylene group; and $R^3$ and $W^1$ are as hereinbefore defined.

In addition to the group of Formula (1) the dye may contain a further reactive group, for example a pyrimidinyl amino group, a vinyl sulphone group or a triazinylamino reactive group.

The pyrimidinylamino reactive group is preferably halopyrimidinylamino, especially trichloropyrimidinylamino, and more especially a difluorochloropyrimidinylamino group.

The term vinyl sulphone group includes vinyl sulphonyl and groups which are convertible to vinyl sulphonyl in the presence of aqueous alkali, for example —$CH_2CH_2OSO_3H$ and —$CH_2CH_2SSO_3H$.

The triazinylamino reactive group is preferably a 2,4,6,-s-triazinylamino group carrying a labile atom or group and either an alkoxy group, especially $C_{1-4}$-alkoxy, or an optionally substituted alkylamino group, especially optionally substituted phenylamino or optionally substituted alkylamino. Preferred optional substituents are selected from sulpho and 2,4,5-trifluoro-3,6-dicyanophenyl. The preferred optionally substituted alkylamino group is an optionally substituted $C_{1-4}$-alkylamino group, for example $CH_3$—NH— and $CH_3CH_2$—NH—.

The term labile atom or group means an atom or group which is bound by a chemical bond to the triazine nucleus, which atom or group is displaceable by a hydroxyl group of cellulose under mildly alkaline aqueous conditions to form a covalent bond between the triazine nucleus and cellulose. As examples of such atoms or groups there may be mentioned halogen atoms such as F and Cl; sulphonic acid groups; thiocyano groups; quaternary ammonium groups such as trialkylammonium groups; and optionally substituted pyridinium groups such as 3- and 4-carboxy pyridinium groups.

The water-soluble dye is preferably a water-soluble azo, anthraquinone, phthalocyanine, triphenodioxazine or formazan dye. Thus preferred dyes are of the formula D—(NR³—Z)$_n$ wherein Z is a group of Formula (1), n is 1, 2 or 3 and D is the residue of an azo, anthraquinone, phthalocyanine, triphenodioxazine or formazan chromophore. Examples of groups represented by D are given in the following pages in Formulae (3) to (11) wherein D is the portion of the illustrated molecules other than group —NR²Z.

Preferred water-soluble azo dyes are monoazo and disazo dyes.

Preferred monoazo dyes are formula L—N=N—L¹—NR³—Z wherein L is an aryl or heteroaryl group, L¹ is an arylene group and Z and R³ are as hereinbefore defined.

It is preferred that each aryl or arylene group independently is a mono- or di-cyclic aryl or arylene group. Preferred aryl groups are optionally substituted phenyl and naphthyl, and preferred arylene groups are optionally substituted phenylene and optionally substituted naphthylene. Preferred heteroaryl groups are pyridonyl and pyrazolonyl.

A first preferred monoazo dye is of the Formula (3) or salt thereof:

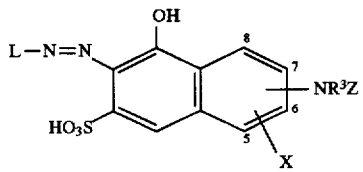

Formula (3)

wherein:

X is H or sulpho; and L, R³ and Z are as hereinbefore defined.

L is preferably optionally substituted phenyl or naphthyl, especially a phenyl or naphthyl group having at least one sulpho substituent. Further optional substituents which may be present on L include a halogen atom, especially chlorine; an alkyl radical, especially $C_{1-4}$-alkyl, more especially methyl; an acylamino radical, especially acetylamino, benzamido or sulphonated benzamido; amino; hydroxy; and an alkoxy radical, especially $C_{1-4}$-alkoxy, more especially methoxy.

As examples of phenyl groups having at least one sulpho substituent there may be mentioned 2-, 3- or 4-sulphophenyl; 2-sulpho-4-nitrophenyl; 2-sulpho-5-nitrophenyl; 4-sulpho-2-methylphenyl; 5-sulpho-2-methylphenyl; 2-sulpho-4-methylphenyl; 5-sulpho-2-methoxyphenyl; 2-sulpho-4-methoxyphenyl; 4-sulpho-2-chlorophenyl; 5-sulpho-2-carboxyphenyl; 2,4-disulphophenyl; 2,5-disulphophenyl; and 3,5-disulphophenyl.

As examples of naphthyl groups having at least one sulpho substituent there may be mentioned 1-sulphonaphth-2-yl; 1,5,7-trisulphonaphth-2-yl; 3,6,8-trisulphonaphth-2-yl; 5,7-disulphonaphth-2-yl; 6-sulphonaphth-2-yl; 4-, 5-, 6-, or 7-sulphonaphth-1-yl; 4,8-disulphonaphth-1-yl; 3,8-disulphonaphth-1-yl; 2,5,7-trisulphonaphth-1-yl; and 3,5,7-trisulphonaphth-1-yl.

Preferred optional substituents which may be present on L¹ are those mentioned above for L.

In dyes of Formula (3) —NR³Z is preferably at the 6-, 7- or 8-position, especially the 6- or 8- position. When —NR³Z is at the 8-position, it is preferred that X is a sulpho group at the 5- or 6- position.

A second preferred monoazo dye is of the Formula (4) or a salt thereof:

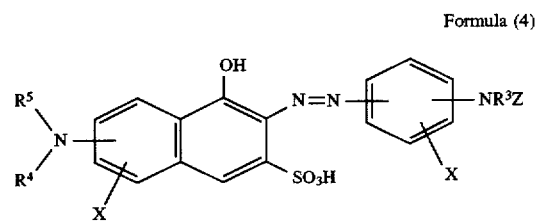

Formula (4)

wherein:

R⁵ is H or $C_{1-4}$-alkyl;

R4 is H, $C_{1-4}$-alkyl; $C_{1-4}$-alkanoyl; optionally substituted benzoyl, especially benzoyl or sulphobenzoyl, acetyl, propanoyl, n-butanoyl or iso-butanoyl; and Z, R³ and each X is as hereinbefore defined.

A third preferred monoazo dye is of the Formula (5) or salt thereof:

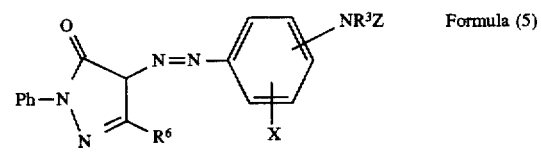

Formula (5)

wherein:

Ph is an optionally substituted phenyl group, especially sulphophenyl;

R⁶ is CN, CH₃ or carboxy; and R³, X and Z are as hereinbefore defined.

A fourth preferred monoazo group is of the Formula (6) or salt thereof:

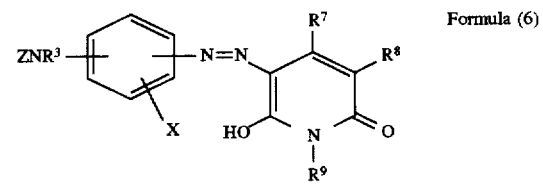

Formula (6)

wherein:

R³ and X are as hereinbefore defined;

R⁷ is $C_{1-4}$alkyl or phenyl;

R⁸ is H, —CN, —NO₂, —CONH₂, —CONH($C_{1-4}$alkyl) or —CO($C_{1-4}$alkyl)₂; and

R⁹ is H, optionally substituted $C_{1-6}$alkyl, optionally substituted phenyl or optionally substituted naphthyl.

It is preferred that R⁷is methyl.

Preferred optional substituents which may be present on R⁹ are as hereinbefore defined for L.

A preferred disazo dye is of Formula (7) or salt thereof:

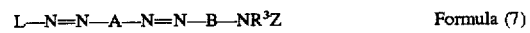

Formula (7)

wherein:

A and B are each independently optionally substituted phenylene or naphthylene; and R³, L and Z are as hereinbefore defined.

It is preferred that B is optionally substituted naphthylene and A is optionally substituted phenylene. The optional substituents which may be present on A or B are preferably independently selected from halo, especially chloro; alkoxy, especially $C_{1-4}$-alkoxy; alkyl, especially methyl; sulpho; carboxy; hydroxy; amino; acylamino especially as acetamido, benzamido and sulphonated benzamido, and pyrimidinylamino or triazinylamino cellulose-reactive groups.

As Examples of groups represented by A and B there may be mentioned phenylene, sulphophenylene, ureidophenylene, 7-sulpho-1,4-naphthylene, 6-sulpho-1,4-naphthylene and 8-sulpho-1,4-naphthylene.

A preferred anthraquinone dye is of the Formula (8) or a salt thereof:

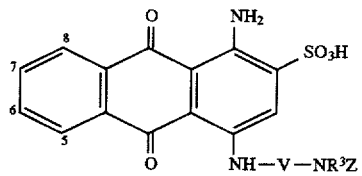

Formula (8)

wherein the anthraquinone nucleus optionally contains a sulphonic acid group in the 5-, 6-, 7-, or 8-position; V is a divalent organic linking group, preferably of the benzene series; and $R^1$ and Z are as hereinbefore defined.

V is preferably phenylene, diphenylene, or 4,4'-divalent stilbene or azobenzene radicals which are optionally sulphonated. It is preferred that V contains one sulphonic acid group for each benzene ring present therein.

A preferred phthalocyanine dye is of the Formula (9) or a salt thereof:

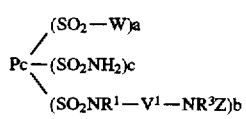

Formula (9)

Wherein Pc is a metallo-phthalocyanine nucleus, preferably copper or nickel phthalocyanine; each $R^3$ and Z is as hereinbefore defined; each W independently is a hydroxy or a substituted or unsubstituted amino group, $V^1$ is a divalent organic linking group, preferably a $C_{1-4}$-alkylene or phenylene linking group; and a, b and c are each independently 1, 2 or 3 provided that a+b+c is not greater than 4.

A preferred triphenodioxazine dye is of the Formula (10) or a salt thereof:

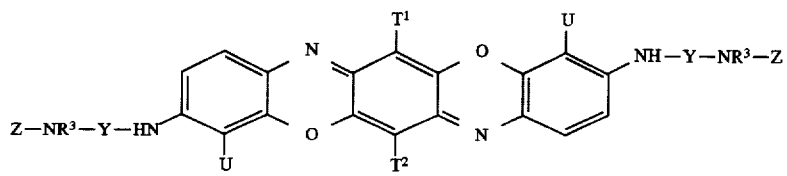

wherein:

each Y independently is a covalent bond, $C_{2-4}$-alkylene, phenylene or sulphophenylene; U is H or $SO_3H$;

$T^1$ and $T^2$ are halo, especially chloro, $C_{1-4}$-alkyl, or $C_{1-4}$-alkoxy; and each Z and $R^3$ independently is as hereinbefore defined.

Each Y is preferably —$C_2H_4$— or —$C_3H_6$—, U is preferably $SO_3H$, and $T^1$ and $T^2$ are preferably Cl, methyl or ethyl.

A preferred formazan dye is of the Formula (11) or a salt thereof:

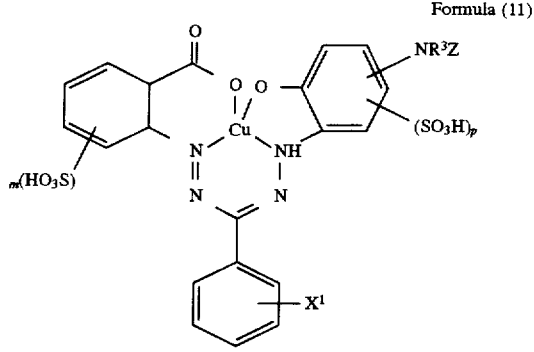

Formula (11)

wherein:

$X^1$ is H, $SO_3H$ or Cl; m and p each independently have a value of 0, 1 or 2; and Z and $R^3$ are as hereinbefore defined; provided that the formazan group has at least one, and preferably at least two, sulpho groups.

It is preferred that m and p each have a value of 1.

The dyes above may be in an unionised or free acid form as shown, but is preferably in the form of a salt with one or more cations selected from an alkali metal, ammonium and optionally substituted $C_{1-4}$-alkylammonium cations. Preferred alkali metal cations include lithium, sodium and potassium. A preferred $C_{1-4}$-alkylammonium cation consists of a nitrogen atom having four substituents selected from H, $C_{1-4}$-alkyl and hydroxy-$C_{1-4}$-alkyl, for example mono-, di-, tri- and tetra-($C_{1-4}$-alkyl)ammonium and mono-, di, tri- and tetra-(hydroxy$C_{1-4}$-alkyl) ammonium. It is preferred that the dye is a salt with an $NH_4^+$ cation or a mono- or poly-, methyl- or ethylammonium cation or with a mixture of two or more cations, especially a mixture of alkali metal and optionally substituted ammonium cations. Examples of optionally substituted $C_{1-4}$-alkylammonium cations include mono-, di-, tri- and tetra-methylammonium, mono-, di-, tri- and tetraethylammonium and mono-, di-, tri- and tetra-(2-hydroxyethyl)ammonium.

The dyes may be converted wholly or partially into its ammonium or optionally substituted $C_{1-4}$-alkyl ammonium salt by dissolving in water the dye in the form of a salt with an alkali metal, acidifying the solution with a mineral acid, such as hydrochloric acid, separating the precipitated compound in free acid form, suspending it in water, adjusting the pH of the suspension to 9 to 9.5 with ammonia or an optionally substituted $C_{1-4}$-alkylamine to form the water-soluble ammonium or $C_{1-4}$-alkylammonium salt and removing the alkali metal chloride ions by dialysis. Alternatively the alkali metal ion may be exchanged for an optionally substituted ammonium ion by a conventional ion exchange method.

Dyes containing groups of the Formula (1) wherein $W^1$ is F may be prepared by a process comprising:

Stage(1)

Condensation of 1,2,4,5-tetrafluoro-3,6-dicyanobenzene and a dye having a nucleophilic group, especially a —$NR^3H$ group, preferably in a liquid medium. It is preferred that the condensation is performed at 10°–90° C., especially 20°–90° C., more especially 40°–90° C. The liquid medium is preferably an aqueous medium or comprises dimethylsulphoxide.

The condensation is preferably performed in the presence of an acid-binding agent. The function of the acid-binding agent is to neutralise hydrogen fluoride as it is formed during the condensation. Accordingly any acid-binding agent may be used provided that it is not present in such a concentration that it causes hydrolysis of the reactants or causes some other side-reaction. It is preferred to use an alkali metal hydroxide, carbonate or bicarbonate, added at such a rate that the pH of the mixture stays within the range of 5.0 to 6.0.

Dyes containing a group of Formula (1) wherein $W^1$ is —$OR^1$, $SR^1$ or —$NR^1R^2$, may be prepared using the above process followed by an additional condensation with a compound of the formula $W^2H$ wherein $W^2$ is —$OR^1$, —$SR^1$ or —$NR^1R^2$.

When $W^1$ in the group of Formula (1) is —OH, it is preferred that the product of Stage (1) is hydrolysed in an aqueous medium under alkaline conditions. More preferably the hydrolysis is performed at a pH in the range 7 to 13 and at a temperature in the range 40° to 90° C.

The ink composition of the present invention preferably contains from 0.5% to 20%, more preferably from 0.5% to 15%, and especially from 1% to 3%, by weight of the dye based on the total weight of the ink. Although many ink compositions contain less than 5% by weight of dye, it is desirable that the dye has a solubility of around 10% or more to allow the preparation of concentrates which may be used to prepare more dilute inks and to minimise the chance of precipitation of dye if evaporation of the medium occurs during use of the ink. It is preferred that the dye is dissolved completely in the medium to form a solution.

Aqueous-based ink compositions are generally used in office or home printers whereas solvent based ink compositions find use in industrial continuous printers.

When the liquid medium is a mixture of water and one or more water-soluble organic solvent(s), the weight ratio of water to water-soluble organic solvent(s) is preferably 99:1 to 1:99, more preferably from 99:1 to 50:50 and especially from 95:5 to 80:20. The water-soluble organic solvent(s) is preferably selected from $C_{1-4}$-alkanols such as methanol, ethanol, n-propanol, isopropanol, n-butanol, sec-butanol, tert-butanol or isobutanol; cyclic alkanols such as cyclohexanol and cyclopentanol; amides such as dimethylformamide or dimethylacetamide; ketones or ketone-alcohols such as acetone or diacetone alcohol; ethers such as tetrahydrofuran or dioxane; oligo- or poly-alkyleneglycols such as diethylene glycol, triethylene glycol, polyethylene glycol or polypropylene glycol; alkyleneglycols or thioglycols containing a $C_2$–$C_6$-alkylene group such as ethylene glycol, propylene glycol, butylene glycol, pentylene glycol or hexylene glycol and thiodiglycol; polyols such as glycerol or 1,2,6-hexanetriol; $C_{1-4}$-alkyl-ethers of polyhydric alcohols such as 2-methoxyethanol, 2-(2-methoxyethoxy)ethanol, 2-(2-ethoxyethoxy)-ethanol, 2-[2-(2-methoxyethoxy) ethoxy]ethanol, 2-[2-(2-ethoxyethoxy)-ethoxy]-ethanol; heterocyclic ketones, such as 2-pyrrolidone and N-methyl-2-pyrrolidone; or mixtures containing two or more of the aforementioned water-soluble organic solvents, for example thiodiglycol and a second glycol or diethylene glycol and 2-pyrrolidone.

Preferred water-soluble organic solvents are 2-pyrrolidone; N-methyl-pyrrolidone; alkylene- and oligo-alkylene-glycols, such as ethyleneglycol, diethyleneglycol, triethyleneglycol; and lower alkyl ethers of polyhydric alcohols such as or 2-methoxy-2-ethoxy-2-ethoxyethanol; and polyethyleneglycols with a molecular weight of up to 500. A preferred specific solvent mixture is a binary or ternary mixture of water and diethylene glycol and/or, 2-pyrrolidone or N-methylpyrrolidone in weight ratios 75-95:25-5 and 60-80:0-20:0-20 respectively.

When the medium is aqueous based, it preferably also contains humectant to inhibit evaporation of water and preservative to inhibit the growth of fungi, bacteria and/or algae in the solution. Examples of suitable humectants are, propan-1,2-diol, butan-1,2-diol, butan-2,3-diol and butan-1,3-diol.

Examples of further suitable ink media are given in U.S. Pat. No. 4,963,189, U.S. Pat. No. 4,703,113, U.S. Pat. No. 4,626,284 and EP 425150A which are incorporated herein by reference thereto.

Where the liquid medium is an organic solvent, the solvent is preferably selected from ketones, alkanols, aliphatic hydrocarbons, esters, ethers, amides or mixtures thereof. Where an aliphatic hydrocarbon is used as the solvent a polar solvent such as an alcohol, ester, ether or amide is preferably added. Preferred organic solvents include ketones, especially methyl ethyl ketone and alkanols especially ethanol and n-propanol.

Organic solvent based ink compositions are used where fast drying times are required and particularly when printing onto hydrophobic substrates such as plastics, metal or glass.

Where the medium for an ink composition is a low melting point solid the melting point of the solid is preferably in the range from 60° C. to 125° C. Suitable low melting point solids include long chain fatty acids and alcohols, preferably those with $C_{18-24}$ chains, or sulphonamides. The dye may be dissolved in the low melting point solid or may be finely dispersed in it.

It is preferred that the medium is a mixture of water and one or more water-soluble organic solvent(s).

The inks may optionally contain other components conventionally used in inks for ink jet printing. For example, viscosity and surface tension modifiers, corrosion inhibitors, kogation reducing additives, and surfactants which may be ionic or non ionic.

A particularly preferred ink composition comprises the parts:

(a) 0.5 to 20 parts of the dye;

(b) 2 to 60 parts of water-soluble organic solvents; and (c) 1 to 95 parts water.

wherein all parts are parts by weight based upon the total weight of the ink and the parts (a)+(b)+(c)=100.

In addition to the parts (a), (b) and (c) the ink may contain other additional components conventionally used in ink formulations as hereinbefore defined.

According to a second aspect of the present invention there is provided a process for printing a substrate with an ink composition using an ink jet printer, characterised in that the ink composition is as defined in the first aspect of the present invention.

A suitable process for the application of an ink compositions as hereinbefore described comprises forming the ink into small droplets by ejection from a reservoir through a small orifice so that the droplets of ink are directed at a substrate. This process is commonly referred to as ink jet printing, and preferred ink jet printing processes for the present inks are piezoelectric ink jet printing and thermal ink jet printing. In thermal ink jet printing, programmed pulses of heat are applied to the ink in the reservoir by means of a resistor adjacent to the orifice, during relative movement between the substrate and the reservoir.

Preferred substrates include overhead projector slides, metal, plastics, glass, paper, including plain and treated papers, which may have an acid, alkaline or neutral character or textile materials such as cotton.

The preferred ink composition used in the process is as hereinbefore described for the first aspect of the present invention.

According to a third aspect of the present invention there is provided a paper or an overhead projector slide printed with an ink composition according to the first aspect of the present invention, or by means of the process according to the second aspect of the present invention.

According to a fourth aspect of the present invention there is provided a process for the coloration of a textile material with an ink composition according to the first aspect of the present invention which comprises the steps:

i) applying the ink composition to the textile material by ink jet printing; and ii) heating the textile material at a temperature from 50° C. to 250° C. to fix the dye on the material.

The process for coloration of a textile material by ink jet printing preferably comprises a pre-treatment of the textile material with an aqueous pretreatment composition comprising a water-soluble base, a hydrotropic agent and a thickening agent followed by removing water from the pre-treated textile material to give a dry pre-treated textile material which is subjected to the ink jet printing in step i) above.

The pretreatment composition preferably comprises an solution of the base and the hydrotropic agent in water containing the thickening agent.

The base is preferably an inorganic alkaline base, especially a salt of an alkali metal with a weak acid such as an alkali metal carbonate, bicarbonate or silicate or an alkali metal hydroxide. The amount of base may be varied within wide limits provided sufficient base is retained on the textile material after pretreatment to promote the formation of a covalent bond between the dye and the pretreated textile material. Where the base is sodium bicarbonate it is convenient to use a concentration of from 1% to 5% by weight based on the total weight of the composition.

The hydrotropic agent is present to provide sufficient water to promote the fixation reaction between the dye and the textile material during the heat treatment, in step (ii) above, and any suitable hydrotropic agent may be employed. Preferred hydrotropic agents are urea, thiourea and dicyandiamide. The amount of hydrotropic agent depends to some extent on the type of heat treatment. If steam is used for the heat treatment generally less hydrotropic agent is required than if the heat treatment is dry, because the steam provides a humid environment. The amount of hydrotropic agent required is generally from 2.5% to 50% by weight of the total composition with from 2.5% to 10% being more suitable for a steam heat treatment and from 20% to 40% being more suitable for a dry heat treatment.

The thickening agent may be any thickening agent suitable for use in the preparation of print pastes for the conventional printing of cellulose reactive dyes. Suitable thickening agents include alginates, especially sodium alginate, xantham gums, monogalactam thickeners and cellulosic thickeners. The amount of the thickening agent can vary within wide limits depending on the relationship between concentration and viscosity. However, sufficient agent is preferred to give a viscosity from 10 to 1000 mpa.s, preferably from 10 to 100 mPa.s. (measured on a Brookfield RVF Viscometer). For an alginate thickener this range can be provided by using from 10% to 20% by weight based on the total weight of the pretreatment composition.

The remainder of the pretreatment composition is preferably water, but other ingredients may be added to aid fixation of the dye to the textile material or to enhance the clarity of print by inhibiting the diffusion (migration) of dye from coloured areas to non-coloured areas before fixation.

Examples of fixation enhancing agents are cationic polymers, such as a 50% aqueous solution of a dicyanamide/phenol formaldehyde/ammonium chloride condensate e.g. MATEXIL FC-PN™ (available from ICI), which have a strong affinity for the textile material and the dye, even a dye which is unreactive and thus increase the fixation of the dye on the textile material.

Examples of anti-migration agents are low molecular weight acrylic resins, e.g. polyacrylates, such as poly(acrylic acid) and poly(vinyl acrylate).

A preferred feature of the present process is that the pretreatment composition also contains such a tertiary amine. Any tertiary amine may be used, but a preferred tertiary amines are substantially odourless compounds such as 1,4-diazabicyclo[2.2.2]octane (DABCO) and susbtituted pyridines, preferably carboxypyridines, and especially those in which the pyridine ring is substituted by a carboxylic acid group in the 3 or 4 position, such as nicotinic or isonicotinic acid.

However, when further agents are added to the pretreatment composition, care must be taken to balance their effects and to avoid interactions with the other ingredients of the composition.

In the pre-treatment stage of the present process the pretreatment composition is preferably evenly applied to the textile material. Where a deeply penetrated print or a deep shade is required the pretreatment composition is preferably applied by a padding or similar process so that it is evenly distributed throughout the material. However, where only a superficial print is required the pretreatment composition can be applied to the surface of the textile material by a printing procedure, such as screen or roller printing, ink jet printing or bar application.

In the pre-treatment stage of the present process, water may be removed from the pre-treated textile material by any suitable drying procedure such as by exposure to hot air or direct heating, e.g. by infra-red radiation, or micro-wave radiation, preferably so that the temperature of the material does not exceed 100° C.

The application of the ink composition to the textile material, stage (i) of the present process, may be effected by any ink jet printing technique, whether drop on demand (DOD) or continuous flow. The ink composition, preferably also contains a humectant to inhibit evaporation of water and a preservative to inhibit the growth of fungi, bacteria and/or algae in the solution. Where the reactive group is labile even in neutral environment, hydrolysis of the reactive group on the dye in the aqueous composition and during the fixation can be inhibited by use, as humectant, of a glycol or mixture of glycols, in which not more than one hydroxy group is a primary hydroxy group. Examples of suitable humectants are, propan-1,2-diol, butan-1,2-diol, butan-2,3-diol and butan-1,3-diol. However, the presence of small amounts, up to about 10%, preferably not more than 5%, in total, of polyols having two or more primary hydroxy and/or primary alcohols is acceptable, although the composition is preferably free from such compounds. Where the ink jet printing technique involves the charging and electrically-controlled deflection of drops the composition preferably also contains a conducting material such as an ionised salt to enhance and stabilise the charge applied to the drops. Suitable salts for this purpose are alkali metal salts of mineral acids.

After application of the ink composition, it is generally desirable to remove water from the printed textile material at relatively low temperatures (<100° C.) prior to the heat applied to fix the dye on the textile material as this has been found to minimise the diffusion of the dye from printed to non-printed regions. As with the pretreated textile material removal of water is preferably by heat, such as by exposure to hot air or to infra-red or micro-wave radiation.

In stage (ii) of the present process, the printed textile material is submitted to a short heat treatment, preferably after removal of water by low-temperature drying, at a temperature from 100° C. to 200° C. by exposure to dry or steam heat for a period of up to 20 minutes in order to effect reaction between the dye and the fibre and thereby to fix the dye on the textile material. If a steam (wet) heat treatment is used, the printed material is preferably maintained at 100°–105° C. for from 5 to 15 minutes whereas if a dry heat treatment is employed the printed material is preferably maintained at 140°–160° C. for from 2 to 8 minutes.

After allowing the textile material to cool, unfixed dye and other ingredients of the pretreatment and dye compositions may be removed from the textile material by a washing sequence, involving a series of hot and cold washes in water and aqueous detergent solutions before the textile material is dried.

According to a fifth aspect of the present invention there are provided textile materials, especially cellulosic textile materials, coloured with the ink compositions according to the first aspect of the present invention or by means of the a process according to the fourth aspect of the present invention.

According to a sixth aspect of the present invention there is provided a toner resin composition comprising a toner resin and a dye characterised in that the dye has at least one group of the Formula (1).

The toner resin is a thermoplastic resin suitable for use in the preparation of toner compositions. A preferred toner resin is a styrene or substituted styrene polymer or copolymer such as polystyrene or styrene-butadiene copolymer, especially a styrene-acrylic copolymer such as a styrene-butyl methacrylate copolymer. Other suitable toner resins include polyesters, polyvinylacetate, polyalkenes, polyvinylchloride, polyurethanes, polyamides, silicones, epoxyresins and phenolic resins. Examples of toner resins are given in Electrophotography by R. M. Scharfert (Focal Press), U.S. Pat. No. 5,143,809, GB 2,090,008, U.S. Pat. No. 4,206,064 and U.S. Pat. No. 4,407,928.

The toner resin composition preferably contains from 0.1% to 20% of the dye containing at least one group of Formula (1) more preferably from 3% to 10% based on the total weight of the toner resin compositions.

The toner resin composition may be prepared by any method known to the art which typically involves mixing the toner resin with the dye of Formula (1) and optionally a charge control agent (CCA) by kneading in a ball mill above the melting point of the resin. Generally, this involves mixing the molten toner resin composition for several hours at temperatures from 120° to 200° C., in order to uniformly distribute the optional CCA and dye throughout the toner resin. The toner resin is then cooled, crushed and micronised until the mean diameter of the particles is preferably below 20 μm and, for high resolution electro-reprography, more preferably from 1 to 10 μm. The powdered toner resin composition so obtained may be used directly or may be diluted with an inert solid diluent such as fine silica by mixing for example in a suitable blending machine.

CCA's are more fully described in WO94/23344.

The invention is illustrated but not limited by the following Examples in which all parts and percentages are by weight unless stated otherwise.

EXAMPLE 1

Preparation of

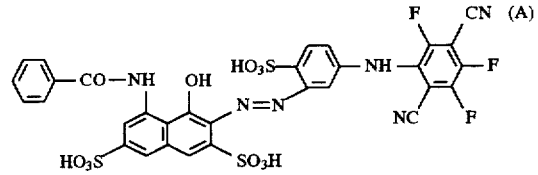

Stage a

To a mixture of N-(β-hydroxyethyl)diethylamine (5.86 g) and 2,4-diaminobenzene sulphonic acid (7.52 g) in dimethylsulphoxide (45 cm³) was added 1,2,4,5-tetrafluoro-3,6-dicyanobenzene (8.25 g) portionwise with stirring. The mixture was heated at 75° C. for 4 hours then poured into ice/water (140 cm³) to give a solution of 2-amino-4-(2,4,5-trifluoro-3,6-dicyanophenylamino)benzene sulphonic acid.

Stage b

2N NaNO₂ (27.2cm³) was added to a cold solution of 2-amino-4-(2,4,5-trifluoro-3,6-dicyanophenylamino) benzene sulphonic acid in water (about 400 cm³) containing conc. hydrochloric acid (15 cm³). The mixture was stirred at <5° C. for 1.5 hrs then excess nitrous acid was destroyed by adding a few drops of 10% sulphamic acid solution to give a diazo compound.

Stage c

The product of stage b was added to a solution of 1-benzoylamino-8-hydroxynaphthalene-1,3-disulphonic acid (0.05M) at <5° C. The pH was adjusted to 6 and the mixture stirred overnight at pH 6.5/<5° C. The mixture was filtered, brine (10% w.v) added to the stirred filtrate and the resultant precipitate was collected and desalinated using Visking tubing.

Water was evaporated from the resultant solution to give a small volume of liquid and the title product was precipitated by the addition of methylated spirits. 14.2 g title product was obtained having a λmax at 530 nm.

EXAMPLES 2 TO 7

Dyes of the formula:

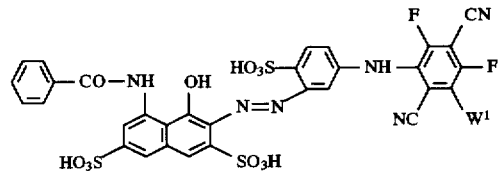

wherein $W^1$ is as shown in Table 1 may be prepared by condensing the compound of the formula $W^1H$ shown in Table 1 with the product of Example 1. Where X is —OH, it is preferred that the product of Example 1 is hydrolysed by heating an aqueous solution of the dye under alkaline conditions.

TABLE 1

| Example | W¹H | —W¹ |
|---|---|---|
| 2 | 2-aminoethanol | HOC$_2$H$_4$NH— |
| 3 | Ammonia | —NH$_2$ |
| 4 | Piperazine | —N⟨piperazinyl⟩NH |
| 5 | Morpholine | —N⟨morpholinyl⟩O |
| 6 | Water (under alkaline conditions) | —OH |
| 7 | Diethylamine | —N(C$_2$H$_5$)$_2$ |

EXAMPLE 8

Preparation of

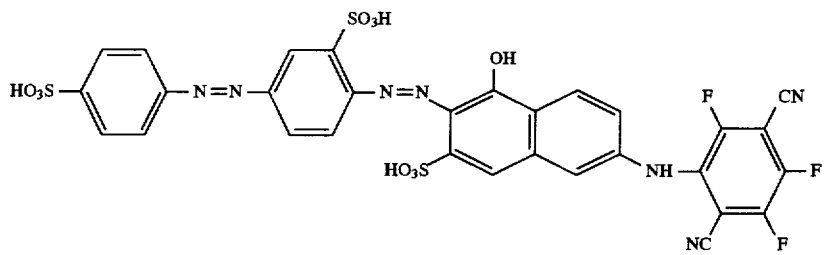

Stage a 1-hydroxy-6-(2,5-dicyano-3,4,6-trifluorophenyl)amino naphthalene-3-sulphonic acid was prepared by condensing tetrafluoro terephalonitrile with 1-hydroxy-6-aminonaphthalene-3-sulphonic acid in dimethylsulphoxide.

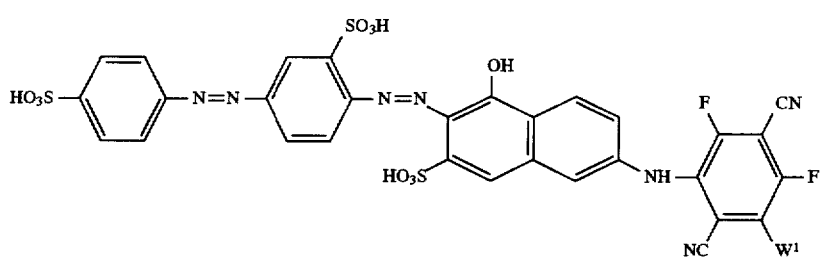

Stage b

A solution of 2-sulpho-4-(4-sulphophenylazo)benzene diazonium chloride (prepared by diazotising 4-amino-3,4'-disulphoazobenzene) (0.1 m) was added at <5° C. to a solution of 1-hydroxy-6-(2,5-dicyano-3,4,6-trifluorophenyl) amino naphthalene-3-sulphonic acid (0.1M) in water. The mixture was stirred at pH 5, 0° C. for 16 hours, allowed to warm to room temperature and filtered. Brine (10% w/v) was added to the stirred filtrate and the resultant precipitate was dissolved in the minimum quantity of water and brine (29% w/v) was added. The resultant precipitate was collected and dried to give the title product (14.6 g, M.I. 1050) having a λmax at 511 nm.

EXAMPLES 9 TO 14

Dyes of the formula:

Wherein the substitent W¹ is shown in Table 2 may be prepared by condensing the compound of the formula W¹H shown in Table 2 with the product of Example 8.

When W¹ is —OH it is preferred that the product of Example 2 is hydrolysed in an aqueous NaOH medium by heating at a temperature of about 70° C. to 80° C. for 2 to 3 hours.

TABLE 2

| Example | W¹H | —W¹ |
|---|---|---|
| 9 | 4-Carboxyphenylamine | 4-COOH-Ph-NH— |
| 10 | Piperidine | Piperidinyl |
| 11 | Piperazine | Piperazinyl |
| 12 | 2-Aminoethanol | HOC₂H₄NH— |
| 13 | Water | —OH |
| 14 | Di(hydroxethyl)amine | (HOC₂H₄)₂N— |

The following dyes may be prepared using similar methods to those described in Examples 1 and 8:

EXAMPLE 15

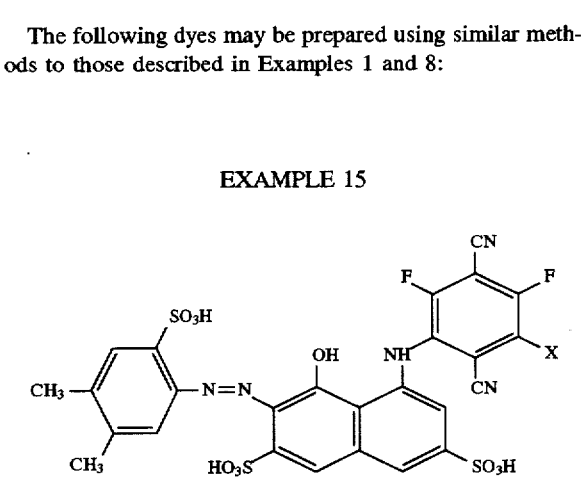

wherein X is F, OH or —NH(C₂H₄OH)

EXAMPLE 16

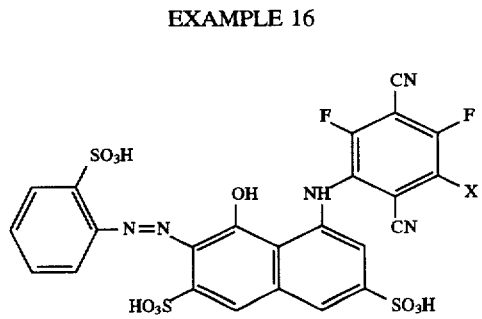

wherein X is F or —OH.

EXAMPLE 17

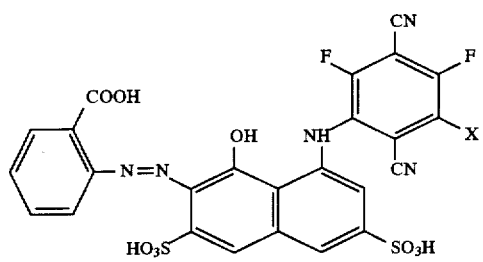

wherein X is F or —OH.

EXAMPLE 18

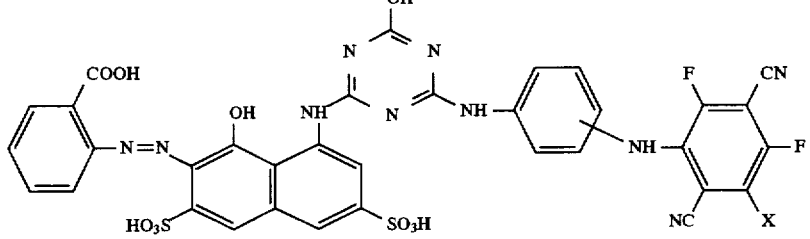

wherein X is F or —OH.

EXAMPLE 19

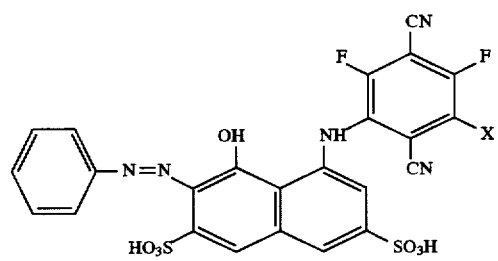

wherein X is F, —OH or —NH₂.

EXAMPLE 20

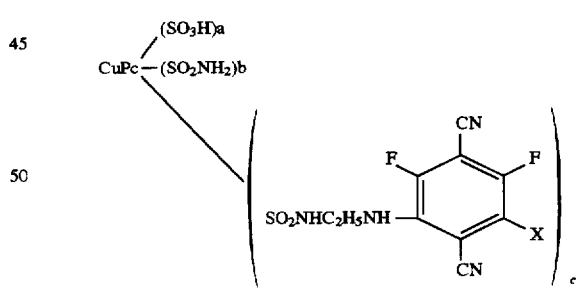

wherein:
CuPc is copper phthalocyanine;
X is F or —OH;
(a+b+c)=4; and
a, b and c are each independently 1 or 2.

EXAMPLE 21

Ink jet printing inks containing dyes described in the foregoing examples may be prepared according to the following formulations shown in Table 3 wherein the figures denote parts by weight for each stated component:

The following abbreviations are used:
PG=propylene glycol.
DEG=diethylene glycol.
NMP=N-methyl pyrollidone.
DMK=dimethylketone.
IPA=isopropanol.
MEOH=methanol.
2P=2-pyrollidone.
MIBK=methylisobutyl ketone.
CET=Cetyl ammonium bromide (a surfactant).
BAS=1:1 mixture by weight of ammonia and methylamine.
PHO=$Na_2HPO_4$.

20 parts of Composition A shown in Table 4.

TABLE 4

| Composition A | |
|---|---|
| Component | Parts by Weight |
| Urea | 25 |
| Distearyl Dimethyl Ammonium Chloride | 2.3 |
| Isopropyl Alcohol | 0.8 |
| Castor Oil + 2.5 Ethylene Oxide | 2.2 |
| Castor Oil + 4.0 Ethylene Oxide | 0.36 |
| Sodium Lauryl Sulphate | 0.010 |
| Methanol | 0.007 |
| Formaldehyde | 0.0001 |
| Tallow Amine + 15 Ethylene Oxide | 0.25 |

| Dye From Example No. | Dye Content | Water | PG | DEG | NMP | DMK | PHO | CET | IPA | MEOH | 2P | MIBK | BAS |
|---|---|---|---|---|---|---|---|---|---|---|---|---|---|
| 1 | 2.0 | 80 | 5 | | 6 | 4 | | | | | 5 | | 3 |
| 2 | 3.0 | 90 | | 5 | 2 | | 0.2 | | | | | | |
| 3 | 1.0 | 85 | 5 | | 2 | 2 | | 0.1 | | 5 | 1 | | |
| 4 | 2.1 | 91 | | 8 | | | | | | | | 1 | |
| 5 | 3.1 | 86 | 5 | | | | | 0.2 | 4 | | | 5 | |
| 6 | 1.1 | 81 | | | 9 | | 0.5 | 0.5 | | | 9 | | |
| 7 | 2.5 | 60 | 4 | 15 | 3 | 3 | | | 6 | 10 | 5 | 4 | |
| 8 | 1.9 | 70 | | 20 | | | | | 10 | | | | |
| 9 | 2.4 | 75 | 5 | 4 | | | | | | 6 | | 5 | 5 |
| 10 | 4.1 | 80 | 3 | 5 | 2 | 10 | | 0.3 | | | | | |
| 11 | 3.2 | 65 | | 5 | 4 | 6 | | | 5 | 4 | 6 | 5 | |
| 2 | 4.6 | 96 | | | | | | | | 4 | | | |
| 3 | 0.8 | 90 | 5 | | | | | 5 | | | | | |
| 4 | 1.2 | 80 | 2 | 6 | 1 | 5 | | | 1 | | 4 | | 1 |
| 5 | 1.8 | 80 | | 5 | | | | | | | 15 | | |
| 6 | 2.6 | 84 | | | 11 | | | | | | 5 | | |
| 7 | 3.3 | 80 | 2 | | | 10 | | | | 2 | | 6 | |
| 8 | 1.7 | 90 | | | 7 | | 0.3 | | 3 | | | | |
| 9 | 1.5 | 69 | 2 | 20 | 2 | 1 | | | | | 3 | 3 | |
| 10 | 1.6 | 91 | | | 4 | | | | | | 4 | | 1 |
| 1 | 10.0 | 70 | 5 | | 6 | 4 | | | | | 5 | | |
| 2 | 8.0 | 85 | | 5 | 2 | | | | | | | | |
| 3 | 12.0 | 77 | 5 | | 2 | | | 2 | | 2 | | | |
| 4 | 9.0 | 76 | | 10 | 2 | | | | | 3 | | | |
| 5 | 11.5 | 77.3 | 5 | | | | | 0.2 | | 1 | 5 | | |
| 6 | 7.0 | 80 | | | 9 | 1 | | | | 3 | | | |
| 8 | 10.4 | 64.6 | | 15 | | | | | 10 | | | | |
| 15 | 8.5 | 73 | 2 | 6 | 1 | 5 | | | | 4 | | | 0.5 |
| 16 | 12.5 | 75 | | | | 8 | 0.5 | 4 | | | | | |
| 17 | 10.0 | 70 | | | 10 | | | | | 12 | | | |
| 9 | 11.0 | 73 | 5 | | 6 | | | | | 5 | | | |
| 20 | 10.0 | 40 | 4 | 15 | 3 | 3 | | | 6 | 10 | 5 | 4 | |

EXAMPLE 22

The ink formulations shown in Table 3 may be applied to a textile material such as sea island cotton using an ink jet printer. Preferably the textile is pre-treated with a composition comprising:

2.5 parts sodium bicarbonate;

15 parts of a 10% aqueous solution of sodium alginate thickening agent;

15 parts of urea;

47.5 parts of water; and

TABLE 4-continued

| Composition A | |
|---|---|
| Component | Parts by Weight |
| Acetic Acid (80%) | 0.05 |
| Water | 69.0 |

The textile material should be thoroughly soaked with the pre-treatment composition in a padding bath and the excess liquor removed by mangling. The material should then be dried in hot air at 100° C. prior to application of the inks shown in Table 3 by an ink jet printer.

The printed textile may be heated at a temperature of from 100° to 200° C. to fix the dye on the textile.

We claim:

1. An ink composition comprising a dye having at least one group of the Formula (1):

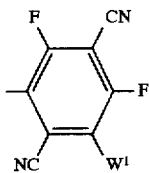

Formula (1)

wherein:

$W^1$ is —F, —$OR^1$, —$SR^1$ or —$NR^1R^2$ in which $R^1$ and $R^2$ each independently is H, optionally substituted alkyl, cycloalkyl, optionally substituted alkenyl, optionally substituted aryl, optionally substituted aralkyl, or $R^1$ and $R^2$ together with the nitrogen atom to which they are attached form a 5 or 6 membered ring; and a medium comprising at least one of a low melting point solid, an organic solvent and a mixture of water and one or more water-soluble organic solvent(s).

2. An ink composition according to claim 1 wherein the group of Formula (1) is attached to an amine group in the dye.

3. An ink composition comprising a medium and a dye having at least one group of the Formula (2):

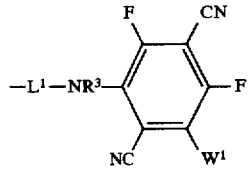

Formula (2)

wherein:

$L^1$ is an arylene group;

$R^3$ is H or alkyl; and $W^1$ and the medium are as defined in claim 1.

4. An ink composition according to any one of the previous claims wherein $W^1$ is F.

5. An ink composition according to any one of the previous claims wherein the dye is a water-soluble azo, anthraquinone, phthalocyanine, triphenodioxazine or formazan dye.

6. An ink according to any one of the previous claims wherein the medium comprises water and one or more water-soluble organic solvent(s).

7. A process for printing a substrate with an ink composition comprising forming the ink into small droplets by ejection from a reservoir through a small orifice so that the droplets of ink are directed at a substrate wherein the ink composition is as defined in any one of the previous claims.

8. A paper or an overhead projector slide printed with an ink composition as defined in any one of claims 1 to 6.

9. A process for the coloration of a textile material with an ink composition according to any one of claims 1 to 6 which comprises the steps:

i) applying the ink composition to the textile material by ink jet printing; and ii) heating the textile material at a temperature from 50° C. to 250°° C. to fix the dye on the material.

10. A process according to claim 9 further comprising a pretreatment of the textile material with an aqueous pretreatment composition comprising a water-soluble base, a hydrotropic agent and a thickening agent.

11. A textile material coloured with an ink composition according to any one of claims 1 to 6.

12. A toner resin composition comprising a toner resin and a dye, wherein the dye has at least one group of the Formula (1) as defined in claim 1.

* * * * *